(12) United States Patent
Simpson et al.

(10) Patent No.: US 7,285,217 B2
(45) Date of Patent: Oct. 23, 2007

(54) REMOVING ODORIFEROUS SULFIDES FROM WASTEWATER

(75) Inventors: Gregory D. Simpson, Seabrook, TX (US); Glenn W. Holden, Spring, TX (US)

(73) Assignee: Siemens Water Technologies Corp., Warrendale, PA (US)

( * ) Notice: Subject to any disclaimer, the term of this patent is extended or adjusted under 35 U.S.C. 154(b) by 547 days.

(21) Appl. No.: 10/991,054

(22) Filed: Nov. 17, 2004

(65) Prior Publication Data

US 2005/0115895 A1 Jun. 2, 2005

Related U.S. Application Data

(60) Provisional application No. 60/526,440, filed on Dec. 2, 2003.

(51) Int. Cl.
*C02F 3/00* (2006.01)

(52) U.S. Cl. ............... 210/611; 210/754; 210/756; 210/759; 210/757; 210/916

(58) Field of Classification Search .......... 210/754, 210/756, 759, 611, 916, 757
See application file for complete search history.

(56) References Cited

U.S. PATENT DOCUMENTS

| | | | |
|---|---|---|---|
| 3,966,450 A | 6/1976 | O'Neill et al. | 71/15 |
| 4,108,777 A | 8/1978 | Kurita et al. | 210/225 |
| 5,114,587 A | 5/1992 | Hagerstedt | 210/614 |
| 5,200,092 A | 4/1993 | Richards et al. | 210/758 |
| 5,984,993 A | 11/1999 | Mainz et al. | 71/12 |
| 6,136,193 A * | 10/2000 | Haase | 210/605 |

* cited by examiner

*Primary Examiner*—Chester T. Barry

(57) ABSTRACT

A synergistic composition is provided for controlling odor from waste products. The composition comprises a combination of nitrate salt, sulfide-consuming compound, pH-elevating compound, sulfide-oxidizing, nitrate-reducing bacteria, and sulfide-oxidizing enzyme. The method includes adding a sufficient amount of the composition to a waste stream to provide sufficient sulfide-consuming compound to effect immediate removal of sulfide. The composition incorporates a pH elevating compound, which both decreases the amount of gaseous $H_2S$ and puts the aqueous phase into a pH range where naturally occurring bacteria can more easily metabolize the sulfide. The composition also includes one or more nitrate salts which will accomplish longer term prevention of odors. Specific bacteria are incorporated into the formulation to insure that the nitrate has the right type and amount of bacteria present to prevent formation of and/or consume sulfide. Specific enzymes are incorporated into the formulation to promote oxidation of sulfide.

35 Claims, 1 Drawing Sheet

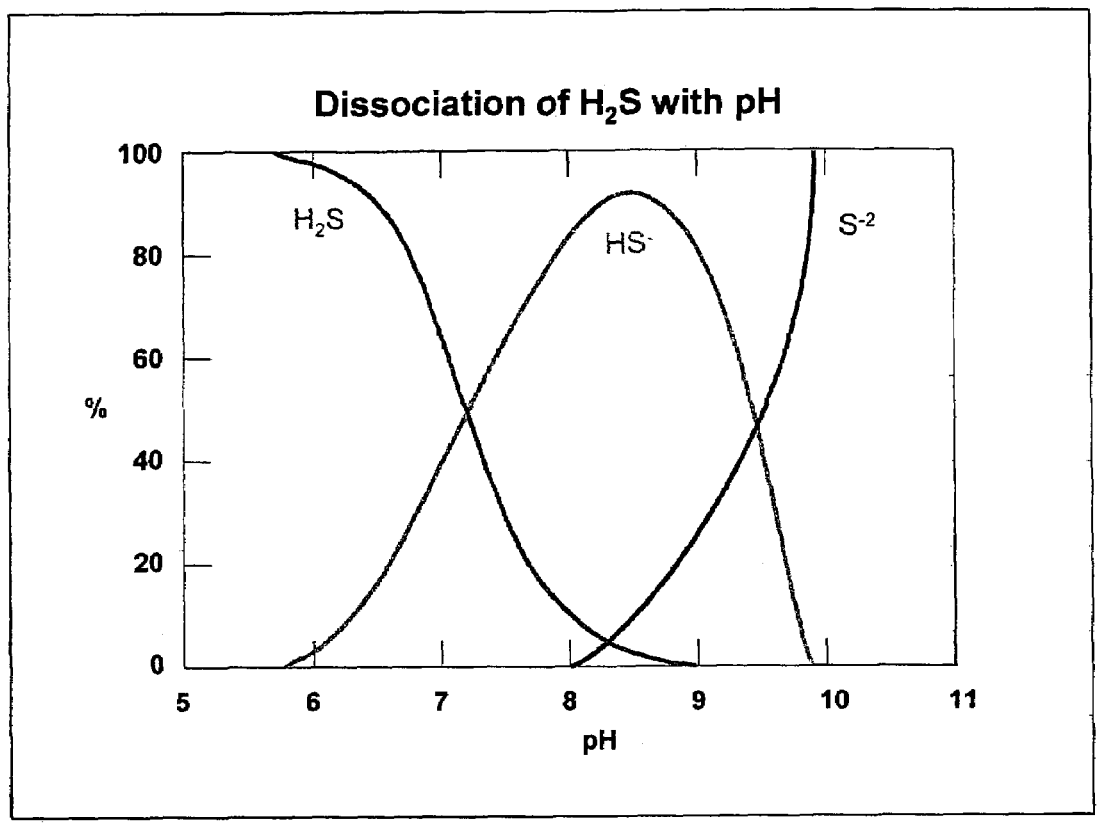

REMOVING ODORIFEROUS SULFIDES FROM WASTEWATER

RELATED APPLICATION

This application is related to Provisional Application Ser. No. 60/526,440 filed Dec. 2, 2003.

FIELD OF THE INVENTION

The present invention relates to a method and composition for controlling odors emanating from organic waste produced by metabolic processes, including human and animal waste, as well as industrial wastes, effluents, sewage, and the like.

BACKGROUND OF THE INVENTION

The biogenic production of volatile compounds which cause objectionable odors is one of the problems associated with the collection and treatment of various waste materials. Domestic sewage is the largest source of such odorous compounds. Various reduced sulfur-containing compounds are common, with hydrogen sulfide being the most objectionable odor-causing compound in such wastes. Because of the magnitude of domestic sewage that is collected and treated and the prominence of the associated odorous sulfidic compounds, the present invention is particularly directed, but not limited to the control of hydrogen sulfide and other sulfide odors in municipal or industrial waste. As used herein, the term "sulfidic compounds" also includes hydrogen sulfide ($H_2S$), mercaptans (RSH), and other related odoriferous sulfidic compounds.

The mixed biological population common to municipal or industrial waste utilizes the compounds found in the waste as a source of nutrient. In this process, oxygen is the preferred terminal electron acceptor, and the nutrient, commonly an organic compound, is oxidized. In highly nutrient loaded systems such as municipal sewage, bacterial action can result in a rapid consumption of oxygen in the water. In the absence of oxygen, bacteria require an alternate terminal electron acceptor.

In general, bacteria will utilize the terminal electron acceptor that provides them with the greatest amount of energy. Thus, there is a preferred selection order of a terminal electron acceptor by bacteria. This order is shown below.

$$O_2 > NO_3^- > Fe > SO_4^{-2} > CO_3^{-2}$$

As nitrate is not typically found in natural waters, the sulfate ion ($SO_4^{-2}$) is generally the preferred alternate. In the absence of oxygen, unless nitrate is added supplementally, those bacteria which can utilize sulfate as a terminal electron acceptor in their respiration process will predominate. The most well-characterized bacteria of this type is *Desulfovibrio desulfuricans*, and is most commonly referred to as sulfate-reducing bacteria, SRB. SRB are known to metabolize sulfate ion with organic matter to form $H_2S$ as shown in the following equation.

$$SO_4^{-2} + \text{organic matter} + SRB \rightarrow H_2S + CO_2 + H_2O$$

$H_2S$, responsible for the characteristic odor from rotten eggs, is toxic in low concentrations. Citizen complaints are often the driving force behind efforts to control odor. Such odors are generally regarded as a public nuisance and a health hazard.

Although $H_2S$ is a gas, $H_2S$ in water can dissociate with increasing pH as shown in the following equations. Thus at a given pH, the relative amount of dissolved $H_2S$ species can be predicted. The sulfide ion, $S^{-2}$, and bisulfide ion, $HS^-$, being ionic, are constrained to remain in the aqueous phase.

$$H_2S + OH^- \rightarrow HS^- + H_2O$$

$$HS^- + OH^- \rightarrow S^{-2} + H_2O$$

($H_2S$—gas phase & aqueous phase, $HS^-$ & $S^{-2}$ aqueous phase)

Description of Figure

The figure herein shows the relationship between these species, the evolution of the gas from aqueous solution being a function of pH. At the pH typically found in sewer systems, a significant percent of the $H_2S$ formed evolves from solution. The gas can redissolve on the crown of the sewer line, and the presence of *Thiobacillus* bacteria and others, metabolize the $H_2S$, producing sulfuric acid, $H_2SO_4$. This can and has resulted in sewer line collapse and results in a significant cost in terms of their repair and replacement.

$H_2S$ is also corrosive towards steel and concrete. $H_2S$ is a gas, with the evolution of the gas from aqueous solution being a function of pH. At pHs often found in sewer systems, a significant percent of the $H_2S$ formed evolves from solution. The gas can redissolve on the crown of the sewer line, and the presence of *Thiobacillus* bacteria and others, metabolize the $H_2S$, producing sulfuric acid, $H_2SO_4$. This can and has resulted in sewer line collapse and results in a significant cost in terms of their repair and replacement.

Various compounds, including hypochlorite (sodium or calcium), potassium permanganate, sodium nitrate, ferrous and ferric salts, hydrogen peroxide, chlorine, chlorine dioxide, and sodium chlorite have been widely used for the control of odor in wastes, and sewage waste in particular.

BACKGROUND REFERENCES

Albertson: Ammonia Nitrogen and the Anaerobic Environment, Journal WPCF, Sept 1961, 33, 978.

Baalsrud, H., and Baalsrud, K., "Studies on *Thiobacillus Denitrificans*," Archiv fur Microbiologie, 20, S 34(1954).

Basic Research On Sulfide Occurrence and Control In Sewage Collection Systems, National Technical Information Service, a-5 (Feb. 28, 1969).

Batchelor, B., and Lawrence, A., "A Kinetic Model for Autotrophic Denitrification Using Elemental Sulfur," unknown ref, p 107.

Batchelor, B., and Lawrence, A., "Autotrophic Denitrification Using Elemental Sulfinur," Journal SPCF, 1986 (August, 1978).

Beardsley, C., Krotinger, N., and Rigdon, J., "Removal of Sewer Odors by Scrubbing with Alkaline Solutions," Sewage and Industrial Wastes 30, 220(1958).

Bryan, A. C., "Experiences With Odor Control at Houston, Tex.", Sew. & Ind. Wastes, 28, 1512 (1956).

Cadena, F., and Peters, R., "Evaluation of Chemical Oxidizers for Hydrogen Sulfide Control," Journal WPCF, 60(7), 1259(July, 1988).

Carpenter, W., "Sodium Nitrate Used to Control Nuisance," Water Works and Sewage, 79, 175(1932).

Corey, N., Montgomery, J., and Benefield, L., "Performance Characteristics of an Activated Sludge System when Nitrate is the Sole Source of Nitrogen," 45th Purdue Industrial Waste Conference Proceedings, 1991.

Dague, R., "Fundamentals of Odor Control," Journal WPCF, 44(4), 583(April 1972).

Dalsgaard, T., and Bak, F., "Nitrate Reduction in a Sulfate-Reducing Bacterium, *Desulfovibrio desulfuricans*, Isolated from Rice Paddy Soil: Sulfide Inhibition, Kinetics, and Regulation," Applied and Environmental Microbiology, 60(1), 291(January 1994).

Davidova, I., Hicks, M., Fedorak, P., and Sufita, J., "The Influence of Nitrate on Microbial Proceses in Oil Industry Production Waters," Journal of Industrial Microbiology and Biotechnology, 27, 80(2001).

Davis patent (original patent) example with patent. Jun. 25, 1997.

Directo, C., and Kugelman, I., "Pilot Plant Study of Physical-Chemical Treatment," Journal WPCF, 49(10), 2085 (October, 1977).

Eastman Chemical Co., "Wastewater Treatment: Add Denitrification to Cut Organic Loads," Environmental Engineering World, 38(July-August 1995).

Eastman Chemical from the Tennessee Assn of Business, "Byproduct Nitrate used in Water Treatment," European Chemical News (Oct. 17, 1994).

Einarsen, A., Aesoy, A., Rasmussen, A., Bungum, S., and Sveberg, M., "Biological Prevention and Removal of Hydrogen Sulfide in Sludge at Lillehammer Wastewater Treatment Plant," Water Science and Technology, 41(6), 175(2000).

Eliassen, R., et al., "The Effect of Chlorinated Hydrocarbons on Hydrogen Sulfide Production", Sew. Works Jour., 21, 457 (1949).

EPA, "Manual—Nitrogen Control," EPA/625/R-93/010, September, 1993

Fales, A., "Treatment of Industrial Wastes from Paper Mills and Tannery on Neponsit River," Journal Ind Eng. Chem, 21, 216(1929).

Fuseler, K, Krekeler, D., Sydow, U., and Cypionka, H., "A Common Pathway of Sulfide Oxidation by Sulfate-Reducing Bacteria," FEMS Microbiology Letters, 144, 129 (1996).

Gommers, P., Bijleveld, W., Zuijderwijk, F, and Kuenen, J., "Simultaneous Sulfide and Acetate Oxidation in a Denitrifying Fluidized Bed Reactor—II: Measurements of Activities and Conversion," Water Research, 22(9), 1085 (1988).

Gommers, P., Bijleveld, W., and Kuenen, J., "Simultaneous Sulfide and Acetate Oxidation in a Denitrifying Fluidized Bed Reactor—I: Start-Up and Reactor Performance," Water Research, 22(9), 1075 (1988).

Heukelekian, H., "Effect of the Addition of Sodium Nitrate to Sewage on Hydrogen Sulfide Production and BOD Reduction," Sewage Works Journal 15(2), 225(1943).

Heukelekian, H., "Some Bacteriological Aspects of Hydrogen Sulfide Production from Sewage," Sewage Works Journal, 20(3), 490(1948).

Hobson, J., and Yang, G., "The Ability of Selected Chemicals for Suppressing Odour Development in Rising Mains," Water Science and Technology 41(6), 165(2000).

Jefferson, B., Hurst, A., Stuetz, R., and Parsons, S., "A Comparison of Chemical Methods for the Control of Odours in Wastewater," Trans IChemE, 80(b) 93(March 2002).

Jenneman, et al., "Effect of Nitrate on Biogenic Sulfide Production, 51 Appl Env. Micro, 1205(1986).

Lang, M, "Chemical Control of Water Quality in a Tidal Basin," Journal WPCF, 38, 1410(1966).

Lawrance, W., "The Addition of Sodium Nitrate to the Androscoggin River," Sew and Ind Wastes, 22, 820 (1950).

Londry, K., and Suflita, J., "Use of Nitrate to Control Sulfide Generation by Sulfate Reducing Bacteria Associated with Oily Waste," Journal of Industrial Microbiology and Biotechnology, 22, 582(1999).

Lorgan, G. P., et al., "Nitrate Addition for the Control of Odor Emissions from Organically Overloaded, Super Rate Trickling Filters", 33rd Ann. Purdue Ind. Waste Conf., West Lafayette, Ind., (1978).

McKinney, R., "The Role of Chemically Combined Oxygen in Biological Systems," Journal of the Sanitary Engineering Division, ASCE, (paper 1053), August, 1956).

Montgomery, A., McInerney, M., and Sublette, K., "Microbial Control of the Production of Hydrogen Sulfide by Sulfate-Reducing Bacteria," Biotechnology and Bioengineering, 35, 533(1990).

Moss, W., Schade, R., Sebesta, S., Scheutzow, K., Beck, P., and Gerson, D., "Full-scale Use of Physical/Chemical Treatment of Domestic Wastewater at Rocky River, Ohio," Journal WPCF, 2249(November 1977).

Myhr, S., Lillebo, B., Sunde, E., Beeder, J., and Torsvik, T., "Inhibition of Microbial $H_2S$ Production in an Oil Reservoir Model Column by Nitrate Injection," Applied Microbiology Biotechnology, 58, 400(2002).

Nemati, M., Jenneman, G., and Voordouw, G., "Mechanistic Study of Microbial Control of Hydrogen Sulfide Production in Oil Reservoirs," Biotechnology and Bioengineering, 74(5), 424(Sep. 5, 2001).

Okabe, S., Santegoeds, C., and DeBeer, D., "Effect of Nitrite and Nitrate on In Situ Sulfide Production in an Activated Sludge Immobilized Agar Gel Film as Determined by Use of Microelectrodes," Biotechnology and Bioengineering, 81(5), 570(Mar. 5, 2003).

Painter, H. A., "A Review of Literature on Inorganic Nitrogen Metabolism in Microorganisms", Water Research, 4(6), 393(1970).

Poduska, R., and Anderson, B., "Successful Storage Lagoon Odor Control," Journal WPCF, 53(3), 299(March, 1981).

Poduska, R. A., "Operation, Control, and Dynamic Modeling of the Tennessee Eastman Company Industrial Wastewater Treatment System", 34th Ann. Purdue Indust. Waste Conf., Lafayette, Md. (1970).

Pollack, D., and Marano, V., "Award Winnihg Utility District Eliminates Chlorine and Extends Life of Costly Carbon Scrubber with Bioxide," The Bulletin, 12(Spring, 1993).

Pomeroy, Johnston and Bailey, "Process Design Manual For Sulfide Control in Sanitary Sewage Systems", October 1974.

Pomeroy, R., and Bowlus, F., "Progress Report on Sulfide Control Research," Sewage Works Journal, 18(4), 597 (July, 1946).

Pomeroy, R. D., "Controlling Sewage Plant Odors", Consulting Eng., Feb. 101 (1963).

Pomeroy, R. D., et al., "Feasibility Study on In-Sewer Treatment Methods", Municipal, Environmental Research Lab. Chapter 6, "Chemical Treatment", 77 (1977).

Pomeroy, R. D., et al., "Sulfide Occurrence and Control in Sewage Collection Systems", U.S. Environmental Protection Agency, EPA 600/X-85-052, Cincinnati, Ohio (1985).

Postgate, J. "The Sulfate Reducing Bacteria," Cambridge University Press, Second Edition, 1984.

Prakasam, T. B. S., et al., "Microbial Dentrification of a Wastewater Containing High Concentrations of Oxidized Nitrogen", Proceedings of the 31st Industrial Waste Conference, May 4-6, 1976, Purdue University.

Price, E. C., et al., "Sewage Treatment Plants Combat Odor Pollution Problems", Water and Sew. Works, 125(10), 64(1978).

Reid, G. W., et al., "Sewer Odor Studies", Sew. and Ind. Wastes, 28, 991 (1956).

Reinsel, M., Sears, J., Stewart, P., and McInerney, M., "Control of Microbial Souring by Nitrate, Nitrite, or Glutaraldehyde Injection in a Sandstone Column," Journal of Industrial Microbiology, 17, 128(1996).

Ryan, W. A., "Experiences with Sodium Nitrate Treatment of Cannery Wastes", Sew. Works Jour., 17, 1227 (1945).

Ripl, W., Biochemical Oxidation of Polluted Lake Sediment with Nitrate—A New Lake Restoration Method,", Ambio v 5 n 3 1976 p 132-135

Salle, A., "Fundamental Principles of Bacteriology," Sixth Edition, McGraw-Hill Book Company, New York, 1967.

Sanborn, N., "Use of Sodium Nitrate in Waste Treatment," Canning Trade, March, 1941.

Sanborn, N. H., "Nitrate Treatment of Cannery Waste", The Fruit Products Journal and American Vinegar Industry, 207(1941).

Santry, I., "Hydrogen Sulfide Odor Control Measures," Journal WPCF, 38(3), 459 (March, 1966).

Santry, I. W., Jr., "Hydrogen Sulfide in Sewers", Jour. Water Poll. Control Fed., 35, 1580 (1963).

Standard Methods for the Examination of Water and Wastewater, 14th Ed., Amer. Pub. Health Assn., Wash. D.C., 499-509 1976.

Steel, Ernest W., "Water Supply and Sewerage", Chapter 27, pp. 600-601 (4th Ed. 1960).

Sturman, P., Goeres, D., and Winters, M., "Control of Hydrogen Sulfide in Oil and Gas Wells with Nitrite Injection," Paper SPE 56772, SPE Tech Conference and Exhibition, Houston, Tex., Oct. 3-6, 1999.

Sublette, K., and Sylvester, D., "Oxidation of Hydrogen Sulfide by *Thiobacillus denitrificans*: Desulfurization of Natural Gas," Biotechnology and Bioengineering, 29, 249(1987). Thistlethwayte, D. K. B., "The Control Of Sulfides In Sewerage Systems", Ann Arbor Science Publishers Inc., Chapter 13, "Corrective Measures For Existing Systems", 159 (1972).

Wanner, O., and Gujer, W., "Competition in Biofilms," Water Science and Technology, 17, 27(1984).

Willenbring et al., "Calcium Nitrate" (incomplete title), October 1988 or earlier. "Biochemical Oxidation of Polluted Lake Sediment with Nitrate—A New Lake Restoration Method", 1976.

Zhang, T., "Feasibility of Using Sulfur:Limestone Pond Reactors to Treat Nitrate-Contaminated Surface Water and Wastewater," submitted for publication in Journal of Environmental Engineering (ASCE).—received Jun. 23, 2000.

REFERENCES DESCRIBING BACKGROUND OF THE INVENTION

Basic Research On Sulfide Occurrence and Control In Sewage Collection Systems, National Technical Information Service, a-5 (Feb. 28, 1969).

Beardsley, C. W., et al., "Removal of Sewer Odors By Scrubbing With Alkaline Solutions", Sewage and Industrial Wastes, vol. 30, 220 (1958).

Bryan, A. C., "Experiences With Odor Control at Houston, Tex.", Sew. & Ind. Wastes, 28, 1512 (1956).

Carpenter, W. T., "Sodium Nitrate Used to Control Nuisance", Water Works and Sew., 79, 175 (1932).

Directo et al., "Pilot plant study of physical-chemical treatment", Journal Water Pollution Control Federation, 49(1),: 2,081-2,098; October 1977.

Eliassen, R., et al., "The Effect of Chlorinated Hydrocarbons on Hydrogen Sulfide Production", Sew. Works Jour., 21, 457 (1949).

Fales, A. L., "Treatment of Industrial Wastes from Paper Mills and Tannery on Neponset River", Jour. Ind. Eng. Chem., 21, 216 (1929).

Heukelekian, H., "Effect of the Addition of Sodium Nitrate to Sewage on Hydrogen Sulfide Production and B.O.D. Reduction", Sewage Works Journal 15(2):255-261 (1943).

Heukelekian, H., "Some Bacteriological Aspects of Hydrogen Sulfide Production from Sewage", Sew. Works Jour., 20,490 (1948).

Lang, M., "Chemical Control Of Water Quality In A Tidal Basin", Journal WPCF, 1414-1416 (1966).

Lawrance, W. A., "The Addition of Sodium Nitrate to the Androscoggin River", Sew. and Ind. Wastes, 22, 820 (1950).

Lorgan, G. P., et al., "Nitrate Addition for the Control of Odor Emissions from Organically Overloaded, Super Rate Trickling Filters", 33rd Ann. Purdue Ind. Waste Conf., West Lafayette, Ind., (1978).

McKinney, R. E., "The Role of Chemically Combined Oxygen in Biological Systems", Jour. San. Eng. Div., Proc. Amer. Soc. Civil Engr., 82 SA4, 1053 (1956).

Methods For Chemical Analysis of Water and Wastes, U.S. Environmental Protection Agency, (1974).

Painter, H. A., "A Review of Literature on Inorganic Nitrogen Metabolism in Microorganisms", Water Research, The Journal of the International Association on Water Pollution Research, vol. 4, No. 6, (1970).

Poduska et al., "Successful storage lagoon odor control", Journal Water Pollution Control Federation, 53(3): 299, 310; March 1981.

Poduska, R. A., "Operation, Control, and Dynamic Modeling of the Tennessee Eastman Company Industrial Wastewater Treatment System", 34th Ann. Purdue Indust. Waste Conf., Lafayette, Md. (1970).

Pomeroy, Johnston and Bailey, "Process Design Manual For Sulfide Control in Sanitary Sewage Systems", October 1974.

Pomeroy, R. D., et al., "Feasibility Study on In-Sewer Treatment Methods", Municipal, Environmental Research Lab. Chapter 6, "Chemical Treatment", 77 (1977).

Pomeroy, R. D., et al., "Sulfide Occurrence and Control in Sewage Collection Systems", U.S. Environmental Protection Agency, EPA 600/X-85-052, Cincinnati, Ohio (1985).

Pomery, R. D., "Controlling Sewage Plant Odors", Consulting Eng., Feb. 101 (1963).

Prakasam, T. B. S., et al., "Microbial Dentrification of a Wastewater Containing High Concentrations of Oxidized Nitrogen", Proceedings of the 31 st Industrial Waste Conference, May 4-6, 1976, Purdue University.

Price, E. C., et al., "Sewage Treatment Plants Combat Odor Pollution Problems", Water and Sew. Works, 125, 10, 64 (1978).

R. R. Dague, "Fundamentals of Odor Control", Journal Water Pollution Control Federation, 44(4): 583-594: April 1972.

Reid, G. W., et al., "Sewer Odor Studies", Sew. and Ind. Wastes, 28, 991 (1956).

Ryan, W. A., "Experiences with Sodium Nitrate Treatment of Cannery Wastes", Sew. Works Jour., 17, 1227 (1945).

Sanborn, N. H., "Nitrate Treatment of Cannery Waste", The Fruit Products Journal and American Vinegar Industry, (1941).

Santry, I. W., Jr., "Hydrogen Sulfide in Sewers", Jour. Water Poll. Control Fed., 35, 1580 (1963).

Santry, I. W., Jr., "Hydrogen Sulfide Odor Control Measures", Jour. Water Poll. Control Fed., 38 459 (1966).

Standard Methods for the Examination of Water and Wastewater, 14th Ed., Amer. Pub. Health Assn., Wash. D.C., 499-509 1976.

Steel, Ernest W., "Water Supply and Sewerage", Chapter 27, pp. 600-601 (4th Ed. 1960).

Thistlethwayte, D. K. B., "The Control Of Sulfides In Sewerage Systems", Ann Arbor Science Publishers Inc., Chapter 13, "Corrective Measures For Existing Systems", 159 (1972).

Willenbring et al., "Calcium Nitrate" (incomplete title), October 1988 or earlier. "Biochemical Oxidation of Polluted Lake Sediment with Nitrate—A new Lake Restoration Method", 1976.

William H. Moss et al., "Full-scale use of physical/chemical treatment of domestic wastewater at Rocky River, Ohio", Journal Water Pollution Control Federation, 49(11): 2.249-2,254; November 1977.

Sodium chlorite has been used alone for odor control. Several references to such use follow:

"Control of Odors from Sewage Sludge," Gas, Wasser, Abwasser, Vol. 65, pp. 410-413 (1985) in Chemical Abstracts 104:10062 (German);

"Polyelectrolyte Conditioning of Sheffield Sewage Sludge," Water Science Technology, Vol. 16, pp. 473-486 (1984) in Chemical Abstracts 102:100249;

"Slime and Odor Elimination in Process Water of the Paper Industry," Papier, Vol. 29, pp. 43-51 (1975) in Chemical Abstracts 85:82749 (German); and "Deodorization of Sludge for Dewatering by Controlled Adding Chlorite," Japanese Patent Publ. No. 06320195 (1994).

It is also known that nitrates added to sewage effect reduction in BOD and even suppress the formation of hydrogen sulfide gas via bacterial action.

U.S. Pat. No. 3,300,404 for example, cites the use of about 500 ppm of nitrate to prevent odor emanation from a lagoon.

U.S. Pat. No. 4,911,843 cites the use of cite the use of nitrate to remove existing sulfide. A dosage of 2.4 parts nitrate-oxygen per part of existing dissolved $H_2S$ is required.

U.S. Pat. Nos. RE36,651 and RE37,181E cite the use of nitrate to remove existing sulfide. A dosage of 2.4 parts nitrate-oxygen per part of existing dissolved $H_2S$ is required.

Even nitrite has been used to control sulfate reducing bacteria and associated odors:

U.S. Pat. No. 4,681,687 cites the use of sodium nitrite to control SRB and $H_2S$ in flue gas desulfurization sludge.

In addition, the use of some sulfide reactive chemicals in combination with nitrates is known:

For example, U.S. Pat. No. 3,966,450 cites the use of 5-500 mg/L of hydrogen peroxide and the addition of nitric acid to maintain a pH of 3.5-5.5 to enhance the nutrient value of the waste.

U.S. Pat. No. 4,108,771 cites the use of chlorate and nitrate coupled with an iron salt in pH<5 to control odors in a waste stream.

U.S. Pat. No. 4,446,031 cites the use of an aqueous solution of ferric sulfate and ferric nitrate in a ratio of from 1:0.5 to 1:3 to control odors in rising sewer mains. Optionally the composition may contain nitric acid.

U.S. Pat. No. 5,114,587 cites the use of nitrate in conjunction with oxygen, air, or iron salt, the dosage controlled by ORP, to reduce the concentration of soluble organic matter.

U.S. Pat. No. 5,200,092 cites the use of about 0.5 to about 10 weight percent potassium permanganate with about 0.5 to about 42 weight percent sodium nitrate for odor control.

Feedrate of the product is such that the permanganate: sulfide ratio is maintained in the range of from about 2:1 to about 6:1.

U.S. Pat. No. 5,405,531 cites the use of nitrite and nitrate and/or molybdate for removal of $H_2S$ in an aqueous system.

U.S. Pat. No. 5,984,993 cites the use of a synergistic blend of 22.5 weight percent chlorite salt and 10 weight percent sodium nitrate for controlling odors.

A combination of nitrate and microorganisms is taught in the following patent:

U.S. Pat. No. 6,059,973 teaches an emulsion of nitrate and microorganisms of the *Bacillus* type for odor control in sewers.

Other compounds reactive with sulfide are known:

U.S. Pat. No. 3,959,130 cites the use of pH adjustment to a value over 7.0 and bringing the stream into contact with an ash product to control cyanide and hydrogen sulfide.

U.S. Pat. No. 4,501,668 cites the use of polycondensation products produced by the condensation of acrolein and formaldehyde to consume hydrogen sulfide in aqueous systems, such as waste water clarification plants.

The use of compounds to elevate pH to convert sulfide species to ionic species which remains in solution and minimizes $H_2S$ gas evolution is taught in the following patents:

U.S. Pat. No. 3,959,130, describes the use of fly ash to elevate the pH of a waste stream containing cyanide and possibly $H_2S$ to above 8.0.

U.S. Pat. No. 5,833,864, cites the use of magnesium oxide or magnesium hydroxide to elevate the pH to the range of 7.5-9.5, thus minimizing the amount of sulfide in the form of gaseous $H_2S$.

The use of compounds to elevate pH to convert sulfide species to ionic species which remains in solution and minimizes $H_2S$ gas evolution is taught in the following patents:

U.S. Pat. No. 3,959,130, describes the use of fly ash to elevate the pH of a waste stream containing cyanide and possibly $H_2S$ to above 8.0.

U.S. Pat. No. 5,833,864, cites the use of magnesium oxide or magnesium hydroxide to elevate the pH to the range of 7.5-9.5, thus minimizing the amount of sulfide in the form of gaseous $H_xS$.

Some of the treatments using specific chemicals have advantages in certain applications. However, they also suffer from various drawbacks, some of which are listed below. The chemicals are separated by their rate of reaction with sulfide or $H_2S$.

| Reacts rapidly with H₂S or sulfide |
|---|

Hypochlorite

Can degrade during storage.
Reacts with ammonia for additional consumption.
Generates chlorine odor with over-doses.
Has no long-term effect.
Corrosive to feed equipment Potassium Permanganate Powder is labor intensive to add.
Causes discoloration with over-doses.
Results in precipitation of manganese.

Iron Salts

Are ineffective for non-sulfide odors.
Cause build-up of solids.
Impure products can contain heavy metals.
Can be toxic to microorganisms.
Deplete dissolved oxygen and alkalinity.
Corrosive to feed equipment.

Chlorine Dioxide

Requires a generator, multiple precursors.
Generates chlorine-type odor with over-doses.
Is not long lasting.

Sodium Chlorite

Can be costly in high doses.

| Rapid reaction with H₂S or sulfide requiring a catalyst |
|---|

Hydrogen Peroxide

Slow reacting without catalyst
Requires catalysis for non-sulfide odors.
Causes foaming.
Is not long lasting.

| Does not react directly with H₂S or sulfide |
|---|

Nitrates

Have no immediate or short term effect.
Produce nitrogen by-products which can present treatment problems.
Reacts indirectly by promoting the growth of sulfide-oxidizing bacteria
Require the presence of nitrate-reducing, sulfide oxidizing bacteria to work.

Magnesium oxide, Magnesium hydroxide, Calcium oxide, Calcium hydroxide

Sparingly soluble
At high concentrations must be fed as a slurry
Can result in precipitation and plugging of pumps, lines In view of the disadvantages cited above, there is a need in the art for a method and composition for abating odor in waste materials that is cost effective, has the capability of consuming aqueous sulfide or H₂S immediately, adjusts the pH into a range where H₂S form is very low and provides long term control of biogenic sulfide production. Accordingly, it is an object of the present invention to address this need in the art. This and other objects of the present invention will become more apparent in light of the following summary and detailed description of the invention.

SUMMARY OF THE INVENTION

This invention relates to a method and composition for the elimination or reduction of sulfidic odors in sewer systems, municipal waste treatment plants and in other industrial waste applications. The composition comprises a synergistic combination of a rapid sulfide-consuming chemical, which is selected from the group comprising an iron salt, a hypochlorite, a permanganate, a persulfate, a perborate, a periodate, a percarbonate, a chlorite, a nitrite, a chlorate, a perchlorate, a peroxide and mixtures thereof and a nitrate salt from the group comprising an ammonium, alkali alkaline metal, or metal nitrate. The method according to the present invention comprises the step of contacting the waste products or their surrounding airspace with the composition.

Existing sulfides are consumed immediately by the sulfide-consuming chemical. The pH-elevating compound adjusts the pH into a range of 7.5-8.5, where the form of sulfide soluble only in aqueous solution is promoted. In addition, adjustment of the pH into this range promote growth of sulfide-oxidizing, nitrate-reducing bacteria, which grow best in this pH range. The nitrate then inhibits the biogenic production of H₂S downstream by both promoting the growth of various sulfide-oxidizing bacteria and inhibiting the growth of anaerobic sulfate reducing bacteria by elevating the oxidation reduction potential into a range which do not provide an environment conducive to their growth. In systems where no sulfide-oxidizing bacteria exist, such bacteria or their enzymes may be incorporated into the formulation. Malodorous compounds can be destroyed and prevented easily, rapidly, at a reasonable cost and continue to be controlled with the composition according to the present invention.

DETAILED DESCRIPTION OF THE INVENTION

The composition for controlling odor from waste products according to the present invention comprises a combination of a rapid-acting sulfide-consuming material and a longer acting material which prevents biogenic sulfide production. For water streams which do not contain sufficient sulfide-oxidizing bacteria, such bacteria are incorporated into the formulation. The rapid-acting sulfide consuming material is selected from the group which includes an iron salt, or a hypochlorite, a permanganate, a persulfate, a perborate, a periodate, a percarbonate, a chlorite, a nitrite, a chlorate, a perchlorate and a peroxide of ammonium, metal or alkali metal and mixtures thereof. The longer acting chemical which prevents the formation of biogenic sulfide is an ammonium, alkali, alkaline metal, or metal nitrate. As used herein, the term "controlling odor" means reducing and/or eliminating odor that is offensive to humans. Such odors are usually caused by volatile sulfides and other volatile odorous substances.

Exemplary of a bacterial microorganism useful for the herein disclosed invention is *Thiobacillus denitrificans* which has the ability to oxidize a variety of reduced sulfur compounds, including H₂S (sulfide), S (elemental sulfur), $S_2O_2^{-2}$ (thionite ion), $S_4O_6^{-2}$ (dithionite ion), and $SO_3^{-2}$ (sulfite ion). The microorganism can function either aerobically or anaerobically with nitrate.

The waste products treatable with the present invention include, but are not limited to organic waste produced by metabolic processes, including human and animal waste, as well as industrial wastes, effluents, sewage, and the like. The preferred aqueous composition includes sodium chlorite at a weight percent of 0.01-0.39%, and sodium nitrate which may range in concentration from 40-80% weight percent, and water at 19.6-59.99 wt %. The preferred dry composition includes sodium chlorite at concentrations of 1-65%, sodium nitrate at 6-90%, magnesium hydroxide or magnesium oxide at 30-95%, a dry bacterial consortium containing mostly *Thiobacillus denitrificans* at concentrations of 0.001-

2% by weight, and a blend of dry enzymes including mostly sulfide dehydrogenase at concentrations of 0.001-2% by weight.

The aqueous solution or the dry composition according to the invention can be employed to destroy and prevent the malodorous characteristics of odor causing compounds such as sulfides found in sewage and other waste products. The solution can be pumped into the material to be treated (liquid, sludge, or solid) or sprayed onto the surface or into the airspace surrounding the material. The dry material can be mixed into a slurry or solution at the point of application and applied in a similar manner.

A solution of sodium chlorite and sodium nitrate according to the invention can be employed to destroy and prevent the malodorous characteristics of odor causing compounds such as sulfides found in sewage and other waste products. The solution can be pumped into the material to be treated (liquid, sludge, or solid) or sprayed onto the surface or into the airspace surrounding the material.

Sodium chlorite is relatively non-reactive with the vast majority of compounds found in sewage. It will react rapidly with sulfide. Thus, the vast majority of the chlorite added to the sewage will consume sulfide, which allows such low levels to be used. The sodium chlorite provides rapid control of low levels of sulfides commonly found at upstream points early in the sewer line distribution system. The treatment concentration is directly dependent upon the amount of odor causing compounds with chlorite demand that are present in the waste.

The sodium nitrate prevents sulfate reducing bacteria from producing $H_2S$. The arrest of $H_2S$ production using nitrate alone is not immediate, can take from 10-24 hours, and will remain until no nitrate is present. The concentration of nitrate salt present in the treatment solution may vary depending upon the amount of residual control of malodorous compounds that is required. Nitrate is less costly than chlorite and thus lowers the cost per pound of the treatment solution. Using a combination of nitrate plus chlorite treatment of sulfide odors also has an unexpected beneficial effect. It is expected that the treatment combination is capable of controlling sulfide odors much more effectively than the sum of the control when using either nitrate or chlorite alone.

As the nitrate requires the presence of nitrate-reducing, sulfide-oxidizing bacteria for it to be effective at consuming sulfide, in systems where no such bacteria reside, such nitrate-reducing, sulfide-oxidizing bacteria or their enzymes may be incorporated into the formulation.

The pH-elevating salt results in an increase in the pH of the waste to be treated, causing the $H_2S$ to revert to a soluble form of bisulfide ion, $HS^-$, or sulfide ion, $S^{-2}$. Controlling the pH of the waste in a range of above 7.5 has also been shown to promote the growth and metabolism of sulfide-oxidizing nitrate-reducing bacteria.

In another embodiment, it is desirable for one of the nitrates to be aluminum nitrate, as use of aluminum salts is known to be effective for phosphorous removal, which is a common problem in municipal wastewater treatment plants. Employment of aluminum nitrate as one of the nitrate salts in the above mentioned formulation can have additional positive benefits which include both rapid consumption of sulfide by the $Al^{+3}$ ion and also promote the removal of phosphorous downstream in the wastewater treatment plant.

It is to be pointed out that U.S. Pat. No. 6,059,973 discloses a mixture of chlorite salt and nitrate salt, the ratios of the patent are different than those claimed herein. Note that the effective range of the herein disclosed invention employs more nitrate than chlorite.

Bacterial consortia is defined as meaning a group of bacteria as found in nature. That is in nature, bacteria do not exist independently of other bacteria. There is always a community required to survive. It is not always feasible nor possible to single out a bacterial strain of the mix. In the a consortia or community of this invention, the predominant bacteria is one like *Thiobacillus denitrificans* (although others are known), which has the ability to oxidize sulfide while using nitrate as the terminal electron acceptor.

In the processes of this invention, the aluminum ion also can react with sulfide in a 3:1 molar ratio and tie up the sulfide and prevent it from off-gassing to cause odor problems. So the aluminum has a double benefit. Tying up the sulfide short term and then precipitating with the phosphate later in the waste treatment plant.

In greater detail the herein disclosed invention is directed to a composition useful for reducing sulfidic odors comprising effective amounts of a sulfide consuming chemical and a nitrate compound. Effective amounts are those amounts herein disclosed. The sulfide consuming chemical may be a chlorite salt and the nitrate compound may be a nitrate salt, with the amount of nitrate compound being in excess of the sulfide consuming chemical. More specifically the chlorite salt is sodium chlorite present in an amount of 0.01-0.39% and the nitrate compound is sodium nitrate and is present in an amount of 40-80%.

The invention also involves a process for removing dissolved hydrogen sulfide and odoriferous reduced sulfur compounds found in waste systems comprising the step of adding to the waste system an aqueous composition comprising a combination of a sulfide consuming chemical, a nitrate salt, and bacterial consortia in a wt ratio comprising 2-10 parts sulfide consuming chemical, 40-80 parts of nitrate salt, 0.01-1 part bacteria or bacterial enzyme, and 9-57.99 parts water. The sulfide consuming chemical may be selected from the group comprising alkali metal salts of hypochlorite, chlorite, nitrite, peroxide, percarbonate, perborate, or ferrous or ferric iron salts, peroxy monosulfuric acid, chlorine, hydrogen peroxide, chlorine dioxide and mixtures thereof. The preferred alkali metal chlorite is selected from the group comprising sodium chlorite, calcium chlorite, potassium chlorite and mixtures thereof, and the most preferred alkali metal chlorite is sodium chlorite. The nitrate salt is selected from the group comprising sodium nitrate, calcium nitrate, potassium nitrate, ammonium nitrate, aluminum nitrate and mixtures thereof. A mixture of ammonium nitrate and other nitrate salts may be employed to achieve a desired crystallization temperature. In a specific embodiment an aluminum nitrate is one of the nitrate salts in the blend and is fed so that the aluminum has the benefit of reducing phosphate in the downstream wastewater plant. In the process the bacterial consortia are comprised of a mixture of nitrate reducing and sulfide-oxidizing bacteria, or enzymes produced by nitrate-reducing, sulfide-oxidizing bacteria. The preferred bacteria is *Thiobacillus denitrificans*, and the preferred enzyme is sulfide dehydrogenase. In the process the aqueous composition may be in the for n of an aqueous solution and the composition may be added to provide sulfide consuming chemical in the ratio of 2-10 parts sulfide-consuming chemical per part sulfide to accomplish removal of sulfide. Further, the composition may be added to provide nitrate ion in the ratio of 10-30 parts nitrate ion per one part sulfide ion by weight. In a most specific process for removing dissolved odoriferous sulfidic compounds including all odoriferous reduced sulfur compounds found in wastewater including dissolved hydrogen sulfide comprises the steps of adding to the waste either as a dry solid or an aqueous composition comprising a combination of a sulfide consuming chemical, a nitrate salt, a salt for pH elevation, a bacterial consortia and enzyme blend added in such a manner that the applied dosage ratio comprises 1-10 parts by weight of sulfide consuming chemical, 10-30 parts by weight of nitrate salt, 10-100 parts by weight of a pH-elevating salt, 0.0001-1 parts by weight of a bacterial consortia, and 0.0001-1 parts by weight of a blend of bacterial enzymes per million parts by weight of water.

As used herein the sulfide consuming chemical is selected from the group comprising alkali metal salts of hypochlorite, chlorite, nitrite, peroxide, percarbonate, permanganate, perborate, ferrous or ferric iron salts, peroxy monosulfuric acid, chlorine, hydrogen peroxide, oxygen, air, chlorine dioxide and mixtures thereof.

In the process an aluminum nitrate is one of the nitrates in the blend and is fed so that the aluminum has the benefits of both consuming sulfide and reducing phosphate in the downstream wastewater plant. In the process a pH elevating salt is selected from the group comprising metal or alkali metal salts of carbonate ion or hydroxide ion or of metal or alkali metal oxides which react with water to form hydroxide ion, and metal or alkali. The preferred metal salts are selected from the group comprising magnesium hydroxide, calcium hydroxide, magnesium oxide, and calcium oxide and mixtures thereof.

The bacterial consortia are comprised of a mixture of nitrate reducing and sulfide-oxidizing bacteria and may include *Thiobacillus denitrificans*, a nitrate-reducing, sulfide-oxidizing bacteria.

An enzyme blend may be comprised of enzymes produced by nitrate-reducing, sulfide-oxidizing bacteria and more specifically the enzyme blend is comprised of sulfide dehydrogenase.

The composition is provided with sulfide consuming chemical in the weight ratio of 1-parts by weight of sulfide consuming chemical per part by weight of sulfide to accomplish removal of sulfide.

Further, the composition is added to provide nitrate ion in the weight ratio of 10-30 parts nitrate ion per million parts by weight of water to prevent biogenic generation of sulfide and the composition is added to provide pH-elevating salt in the weight ratio of 10-100 parts pH-elevating salt by weight per million parts by weight of waste.

The sulfide consuming chemical in the weight ratio of 1-10 parts by weight of sulfide consuming chemical per part by weight of sulfide is added to accomplish removal of sulfide.

The composition is added to provide nitrate ion in the weight ratio of 10-30 parts nitrate ion per million parts by weight of water to prevent biogenic generation of sulfide. The process involves a composition being added to provide pH-elevating salt in the weight ratio of 10-100 parts pH-elevating salt by weight per million parts by weight of waste.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A process for removing dissolved hydrogen sulfide and odoriferous reduced sulfur compounds found in waste systems comprising the step of adding to the waste system an aqueous composition comprising a combination of a sulfide-consuming chemical, a nitrate salt, and a bacterial consortium in a weight ratio of 2-10 parts sulfide-consuming chemical, 40-80 parts nitrate salt, 0.01-1 part bacteria or bacterial enzyme, and 9-57.99 parts water.

2. The process according to claim 1 where the sulfide-consuming chemical is selected from the group consisting of alkali metal salts of hypochlorite, chlorite, nitrite, peroxide, percarbonate, or perborate; ferrous iron salts; ferric iron salts; peroxy monosulfuric acid; chlorine; hydrogen peroxide; chlorine dioxide; and mixtures thereof.

3. The process according to claim 2 where the sulfide-consuming chemical is an alkali metal chlorite.

4. The process according to claim 3 where the alkali metal chlorite is selected from the group consisting of sodium chlorite, calcium chlorite, potassium chlorite, and mixtures thereof.

5. The process according to claim 1 where the nitrate salt is selected from the group consisting of sodium nitrate, calcium nitrate, potassium nitrate, ammonium nitrate, aluminum nitrate, and mixtures thereof.

6. The process according to claim 5 wherein a mixture of ammonium nitrate and other nitrate salts is selected to achieve a desired crystallization temperature.

7. The process according to claim 6 wherein an aluminum nitrate is one of the nitrate salts in the mixture and is fed so that the aluminum reduces phosphate in a downstream wastewater treatment plant.

8. The process according to claim 1 where the bacterial consortium comprises a mixture of nitrate-reducing and sulfide-oxidizing bacteria.

9. The process according to claim 1 where the enzymes are those enzymes produced by nitrate-reducing, sulfide-oxidizing bacteria.

10. The process of claim 8 wherein the bacterial consortium consists mainly of sulfide-oxidizing nitrate-reducing bacteria.

11. The process of claim 1 wherein the bacterial enzyme is sulfide dehydrogenase.

12. The process according to claim 1 wherein the composition is in the form of an aqueous solution.

13. The process according to claim 1 wherein the composition is added to provide sulfide-consuming chemical in the ratio of 2-10 parts sulfide-consuming chemical per part sulfide to accomplish removal of sulfide.

14. The process according to claim 1 wherein the composition is added to provide nitrate ion in the ratio of 10-30 parts nitrate ion per one part sulfide ion by weight.

15. A process for removing dissolved odoriferous sulfidic compounds including all odoriferous reduced sulfur compounds found in wastewater including dissolved hydrogen sulfide, in waste systems comprising the step of: Adding to the wastewater a composition comprising a combination of a sulfide-consuming chemical, a nitrate salt, a salt for pH elevation a bacterial consortium, and enzyme blend in such a manner that the applied dosage ratio comprises 1-10 parts by weight of sulfide-consuming chemical, 10-30 parts by weight of nitrate salt, 10-100 parts by weight of a pH-elevating salt, 0.0001-1 parts by weight of the bacterial consortium, and 0.0001-1 parts by weight of a blend of bacterial enzymes per million parts by weight of water.

16. The process according to claim 15 where the sulfide-consuming chemical is selected from the group consisting of alkali metal salts of hypochlorite, chlorite, nitrite, peroxide, percarbonate, permanganate, or perborate; ferrous iron salt;

ferric iron salts; peroxy monosulfuric acid, chlorine; hydrogen peroxide; oxygen; air; chlorine dioxide; and mixtures thereof.

17. The process according to claim 16 where the sulfide-consuming chemical is an alkali metal chlorite.

18. The process according to claim 17 where the alkali metal chlorite is selected from the group consisting of sodium chlorite, calcium chlorite, potassium chlorite, and mixtures thereof.

19. The process according to claim 18, where the alkali metal chlorite is sodium chlorite.

20. The process according to claim 15 where the nitrate salt is selected from the group consisting of sodium nitrate, calcium nitrate, iron nitrate, potassium nitrate, ammonium nitrate, aluminum nitrate, and mixtures thereof.

21. The process according to claim 20 wherein an aluminum nitrate is one of the nitrates in the composition and is fed so that the aluminum consumes sulfide and reduces phosphate in a downstream wastewater plant.

22. The process according to claim 15 wherein the pH-elevating salt is selected from the group consisting of metal or alkali metal salts of carbonate ion, metal or alkali metal salts of hydroxide ion, and metal or alkali metal oxides which react with water to form hydroxide ion.

23. The process according to claim 22 wherein the metal or alkali metal salts are selected from the group consisting of magnesium hydroxide, calcium hydroxide, magnesium oxide, calcium oxide, and mixtures thereof.

24. The process according to claim 15 wherein the bacterial consortium comprises a mixture of nitrate-reducing and sulfide-oxidizing bacteria.

25. The process according to claim 24 wherein the bacterial consortium comprises *Thiobacillus denitrificans*.

26. The process according the claim 15 wherein the enzyme blend comprises those enzymes produced by nitrate-reducing, sulfide-oxidizing bacteria.

27. The process according to claim 25, wherein the enzyme blend comprises sulfide dehydrogenase.

28. The process according to claim 15 wherein the composition is in the form of an aqueous solution.

29. The process according to claim 15 wherein the composition provides a sulfide-consuming chemical in the weight ratio of 1-10 parts by weight of sulfide-consuming chemical per part by weight of sulfide.

30. The process according to claim 15 wherein the composition provides nitrate ion in the weight ratio of 10-30 parts nitrate ion per million parts by weight of wastewater to prevent biogenic generation of sulfide.

31. The process according to claim 15 wherein the composition provides pH-elevating salt in the weight ratio of 10-100 parts pH-elevating salt by weight per million parts by weight of wastewater.

32. The process according to claim 15 where the composition is in the form of a dry solid.

33. The process according to claim 15 wherein the composition provides nitrate ion in the weight ratio of 10-30 parts nitrate ion per million parts by weight of wastewater.

34. The process according to claim 15 wherein the composition provides pH-elevating salt in the weight ratio of 10-100 parts pH-elevating salt by weight per million parts by weight of wastewater.

35. The process of claim 8 wherein the sulfide-oxidizing nitrate-reducing bacteria is *Thiobacillus denitrificans*.

* * * * *